(12) United States Patent
Caveney

(10) Patent No.: US 7,756,047 B2
(45) Date of Patent: Jul. 13, 2010

(54) METHOD AND APPARATUS FOR DOCUMENTING NETWORK PATHS

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 439 days.

(21) Appl. No.: 11/925,033

(22) Filed: Oct. 26, 2007

(65) Prior Publication Data
US 2008/0043631 A1 Feb. 21, 2008

Related U.S. Application Data

(62) Division of application No. 11/419,243, filed on May 19, 2006, now Pat. No. 7,613,124.

(60) Provisional application No. 60/682,395, filed on May 19, 2005.

(51) Int. Cl.
*H04L 12/26* (2006.01)
*H04B 3/36* (2006.01)

(52) U.S. Cl. ........................ 370/248; 370/293

(58) Field of Classification Search ......... 370/241–248, 370/293, 400, 401, 492
See application file for complete search history.

(56) References Cited

U.S. PATENT DOCUMENTS

| | | | |
|---|---|---|---|
| 3,052,842 A | 9/1962 | Frohman et al. | |
| 3,573,789 A | 4/1971 | Sharp et al. | |
| 3,573,792 A | 4/1971 | Reed et al. | |
| 3,914,561 A | 10/1975 | Schardt et al. | |
| 4,018,997 A | 4/1977 | Hoover et al. | |
| 4,072,827 A | 2/1978 | Oman | |
| 4,096,359 A | 6/1978 | Barsellotti | |

(Continued)

FOREIGN PATENT DOCUMENTS

EP 0297079 3/1992

(Continued)

OTHER PUBLICATIONS

"Finding the Missing Link," Cabling Installation & Maintenance, Jun./Jul. 2002.

(Continued)

*Primary Examiner*—Hong Cho
(74) *Attorney, Agent, or Firm*—Robert A. McCann; Zachary J. Smolinski

(57) ABSTRACT

Methods and apparatus for documenting network path connectivity are described that allow a network management system/revision management system (NMS/RMS) to determine what equipment and ports support a network path by interrupting and restoring Power-over-Ethernet (PoE) service on the network path. Upon detecting a loss of PoE service, communication active jacks that support network path connectivity may activate an internal switch that interrupts downstream connectivity. Each communication active jack along the network path may then begin broadcasting a unique message in the upstream direction that is addressed to the NMS/RMS. Upon receiving a unique active jack message, the NMS/RMS may record the information contained within and instruct the communication active jack to reestablish connectivity to the next downstream device. In this manner, as each device along a network path regains connectivity the network path information stored within the NMS/RMS is updated until a complete view of the network path is documented.

8 Claims, 3 Drawing Sheets

U.S. PATENT DOCUMENTS

| | | |
|---|---|---|
| 4,140,885 A | 2/1979 | Verhagen |
| 4,196,316 A | 4/1980 | McEowen et al. |
| 4,517,619 A | 5/1985 | Uekubo |
| 4,673,246 A | 6/1987 | Schembri |
| 4,773,867 A | 9/1988 | Keller et al. |
| 4,796,294 A | 1/1989 | Nakagawara |
| 4,869,566 A | 9/1989 | Juso et al. |
| 4,901,004 A | 2/1990 | King |
| 4,937,835 A | 6/1990 | Ballard et al. |
| 5,037,167 A | 8/1991 | Beaty |
| 5,107,532 A | 4/1992 | Hansen et al. |
| 5,111,408 A | 5/1992 | Amjadi |
| 5,145,380 A | 9/1992 | Holcomb et al. |
| 5,161,988 A | 11/1992 | Krupka |
| 5,170,327 A | 12/1992 | Burroughs |
| 5,204,929 A | 4/1993 | Machall et al. |
| 5,222,164 A | 6/1993 | Bass, Sr. et al. |
| 5,226,120 A | 7/1993 | Brown et al. |
| 5,233,501 A | 8/1993 | Allen et al. |
| 5,265,187 A | 11/1993 | Morin et al. |
| 5,270,658 A | 12/1993 | Epstein |
| 5,305,405 A | 4/1994 | Emmons et al. |
| 5,353,367 A | 10/1994 | Czosnowski et al. |
| 5,394,503 A | 2/1995 | Dietz, Jr. et al. |
| 5,432,847 A | 7/1995 | Hill et al. |
| 5,483,467 A | 1/1996 | Krupka et al. |
| 5,487,666 A | 1/1996 | DiGiovanni |
| 5,521,902 A | 5/1996 | Ferguson |
| 5,532,603 A | 7/1996 | Bottman |
| 5,546,282 A | 8/1996 | Hill et al. |
| 5,550,755 A | 8/1996 | Martin et al. |
| 5,583,874 A | 12/1996 | Smith et al. |
| 5,617,421 A * | 4/1997 | Chin et al. .................. 370/402 |
| 5,684,796 A | 11/1997 | Abidi et al. |
| 5,726,972 A | 3/1998 | Ferguson |
| 5,727,055 A | 3/1998 | Ivie et al. |
| 5,754,112 A | 5/1998 | Novak |
| 5,764,043 A | 6/1998 | Czosnowski et al. |
| 5,790,041 A | 8/1998 | Lee |
| 5,832,071 A | 11/1998 | Voelker |
| 5,847,557 A | 12/1998 | Fincher et al. |
| 5,854,824 A | 12/1998 | Bengal et al. |
| 5,870,626 A | 2/1999 | Lebeau |
| 5,876,240 A | 3/1999 | Derstine et al. |
| 5,878,030 A | 3/1999 | Norris |
| 5,892,756 A | 4/1999 | Murphy |
| 5,898,837 A | 4/1999 | Guttman et al. |
| 5,915,993 A | 6/1999 | Belopolsky et al. |
| 5,923,663 A | 7/1999 | Bontemps et al. |
| 5,944,535 A * | 8/1999 | Bullivant et al. .............. 439/49 |
| 6,002,331 A | 12/1999 | Laor |
| 6,041,352 A | 3/2000 | Burdick et al. |
| 6,067,014 A | 5/2000 | Wilson |
| 6,078,113 A | 6/2000 | True et al. |
| 6,086,415 A | 7/2000 | Sanchez et al. |
| 6,094,261 A | 7/2000 | Contarino, Jr. |
| 6,175,865 B1 | 1/2001 | Dove et al. |
| 6,222,908 B1 | 4/2001 | Bartolutti et al. |
| 6,229,538 B1 | 5/2001 | McIntyre et al. |
| 6,234,830 B1 | 5/2001 | Ensz et al. |
| 6,243,510 B1 | 6/2001 | Rauch |
| 6,285,293 B1 | 9/2001 | German et al. |
| 6,330,307 B1 | 12/2001 | Bloch et al. |
| 6,350,148 B1 | 2/2002 | Bartolutti et al. |
| 6,381,283 B1 | 4/2002 | Bhardwaj et al. |
| 6,421,322 B1 * | 7/2002 | Koziy et al. .................. 370/248 |
| 6,424,710 B1 | 7/2002 | Bartolutti et al. |
| 6,434,716 B1 | 8/2002 | Johnson et al. |
| 6,437,894 B1 | 8/2002 | Gilbert et al. |
| 6,453,014 B1 | 9/2002 | Jacobson et al. |
| 6,456,768 B1 | 9/2002 | Boncek et al. |
| 6,499,861 B1 | 12/2002 | German et al. |
| 6,522,737 B1 | 2/2003 | Bartolutti et al. |
| 6,523,070 B1 * | 2/2003 | Stapleton et al. ............ 709/250 |
| 6,561,827 B2 | 5/2003 | Frostrom et al. |
| 6,574,586 B1 | 6/2003 | David et al. |
| 6,577,243 B1 | 6/2003 | Dannenmann et al. |
| 6,587,454 B1 * | 7/2003 | Lamb ......................... 370/352 |
| 6,601,097 B1 | 7/2003 | Cheston et al. |
| 6,626,697 B1 | 9/2003 | Martin et al. |
| 6,629,269 B1 | 9/2003 | Kahkoska |
| 6,684,179 B1 | 1/2004 | David |
| 6,688,910 B1 | 2/2004 | Macauley |
| 6,714,698 B2 | 3/2004 | Pfeiffer et al. |
| 6,725,177 B2 | 4/2004 | David et al. |
| 6,750,643 B2 | 6/2004 | Hwang et al. |
| 6,778,911 B2 | 8/2004 | Opsal et al. |
| 6,784,802 B1 | 8/2004 | Stanescu |
| 6,798,944 B2 | 9/2004 | Pfeiffer et al. |
| 6,802,735 B2 | 10/2004 | Pepe et al. |
| 6,823,063 B2 | 11/2004 | Mendoza |
| 6,857,897 B2 | 2/2005 | Conn |
| 6,871,156 B2 | 3/2005 | Wallace et al. |
| 6,898,368 B2 | 5/2005 | Colombo et al. |
| 6,992,491 B1 | 1/2006 | Lo et al. |
| 7,005,861 B1 | 2/2006 | Lo et al. |
| 7,027,704 B2 | 4/2006 | Frohlich et al. |
| 7,028,087 B2 | 4/2006 | Caveney |
| 7,068,043 B1 | 6/2006 | Lo et al. |
| 7,068,044 B1 | 6/2006 | Lo et al. |
| 7,160,143 B2 | 1/2007 | David et al. |
| 7,207,846 B2 | 4/2007 | Caveney et al. |
| 7,234,944 B2 | 6/2007 | Nordin et al. |
| 2002/0069277 A1 | 6/2002 | Caveney |
| 2002/0071394 A1 | 6/2002 | Koziy et al. |
| 2002/0090858 A1 | 7/2002 | Caveney |
| 2002/0116485 A1 | 8/2002 | Black et al. |
| 2003/0061393 A1 | 3/2003 | Steegmans et al. |
| 2003/0152087 A1 | 8/2003 | Shahoumian et al. |
| 2004/0052471 A1 | 3/2004 | Colombo et al. |
| 2004/0065470 A1 | 4/2004 | Goodison et al. |
| 2004/0073597 A1 | 4/2004 | Caveney et al. |
| 2004/0077220 A1 | 4/2004 | Musolf et al. |
| 2004/0219827 A1 | 11/2004 | David et al. |
| 2005/0111491 A1 | 5/2005 | Caveney |
| 2005/0136729 A1 | 6/2005 | Redfield et al. |
| 2005/0141431 A1 | 6/2005 | Caveney et al. |
| 2005/0195584 A1 | 9/2005 | AbuGhazaleh et al. |
| 2005/0224585 A1 | 10/2005 | Durrant et al. |
| 2005/0231325 A1 | 10/2005 | Durrant et al. |
| 2005/0239339 A1 | 10/2005 | Pepe |
| 2005/0245127 A1 | 11/2005 | Nordin et al. |
| 2006/0047800 A1 | 3/2006 | Caveney et al. |
| 2006/0262727 A1 | 11/2006 | Caveney |
| 2006/0282529 A1 | 12/2006 | Nordin |
| 2007/0032124 A1 | 2/2007 | Nordin et al. |
| 2007/0117444 A1 | 5/2007 | Caveney et al. |
| 2007/0132503 A1 | 6/2007 | Nordin |

FOREIGN PATENT DOCUMENTS

| | | |
|---|---|---|
| EP | 0575100 | 4/1998 |
| EP | 0745229 | 3/2003 |
| FR | 2680067 A1 | 8/1991 |
| GB | 2236398 | 4/1991 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 0155854 A1 | 8/2001 |
| WO | 2004044599 | 5/2004 |
| WO | 2005072156 | 8/2005 |

WO 2006052686 A1 5/2006

OTHER PUBLICATIONS

"IntelliMAC—The New Intelligent Cable Management Solution by ITRACS&NORDX/CDT," Press Release 2003.
"RiT Technologies Ltd. SMART Cabling System," RiT Technologies Ltd., 2004.
"Ortronics Launches iTRACS—Ready Structured Cabling Solutions," News Release Mar. 7, 2003.
"The Systimax iPatch System—Intelligent yet simple patching . . . ", CommScope, Inc., 2004.
"White Paper—Intelligent Patching," David Wilson, Nov. 2002.
"PatchView for the Enterprise (PV4E) technical background/Networks for Business," Jun. 24-26, 2003.
"RiT Technologies Ltd. Go Patch-less," May 2000 Edition of Cabling Systems.
"Intelligent Cable Management Systems—Hot Topics—Trescray", Jul. 2008.
"Brand-Rex Network solutions Access racks Cat 5E6 cabling UK", Jul. 2008.
"Molex Premise Networks/Western Europe-Real Time Patching System," Molex Prem. Networks, 2001.
"Product of the Week—Molex's Real Time Patching System", Jul. 2008.
"EC&M Taking Note of Patch Panel Technology," Mark McElroy, Jun. 1, 1998.
"Intelligent Patching SMARTPatch for the Enterprise (SP4E)", Jul. 2008.

* cited by examiner

METHOD AND APPARATUS FOR DOCUMENTING NETWORK PATHS

CROSS-REFERENCE TO RELATED APPLICATIONS

This application is a divisional of U.S. patent application Ser. No. 11/419,243 filed May 19, 2006, which claims priority to U.S. Provisional Application 60/682,395 filed May 19, 2005, which is hereby incorporated by reference in its entirety. This application incorporates by reference in their entirety U.S. patent application Ser. No. 10/439,716, entitled "Systems and Methods for Managing a Network" filed May 16, 2003 and U.S. application Ser. No. 10/997,600 filed Nov. 23, 2004, entitled "Communication Patch Panels Systems and Methods," as well as all materials incorporated therein by reference.

BACKGROUND

1. Technical Field

This invention pertains to a documentation system for a communication network.

2. Description of Related Art

One of the difficult challenges faced by IT network managers is the collection and maintenance of accurate communication network documentation.

SUMMARY

Methods and apparatus are described by which, in various embodiments, communication network devices that support a network connection within a communication network report to a network management system (NMS), or a revision management system (RMS), in response to an interruption and restoration of Power-over-Ethernet (PoE) service. The approach allows an NMS and/or an RMS (NMS/RMS) to document a network path. In one embodiment, a network path is an inter-connected chain of communication network devices that support a network connection. The network path may, in one embodiment, be documented by interrupting and restoring PoE service to the network connection.

In this example, upon detecting a loss of PoE service, one or more network path devices may activate an internal switch that disconnects downstream connectivity. Downstream connectivity is connectivity in a direction towards end-user equipment supported by the network path, while upstream connectivity is connectivity in a direction away from end-user equipment supported by the network path. The respective network path devices may then initiate the repeated broadcast of a network message in the network path upstream direction that is addressed to the NMS/RMS. However, given that downstream connectivity has been disconnected, as described above, the NMS/RMS may receive the message broadcast by the network path device that is furthest upstream on the network path. That is, the NMS/RMS may receive the message broadcast by the network path device that is physically closest to the NMS/RMS with respect to the other network devices that form the network path.

Upon receipt of a network path device broadcast message, the NMS/RMS may store information received within the broadcast message and may transmit a return message to the broadcasting device. The return message may instruct the broadcasting device to stop broadcasting and to reconnect downstream connectivity. In this manner, upstream connectivity is restored to the next device in the network path. As each subsequent downstream network path device regains upstream connectivity and reports to the NMS/RMS, as described above, the NMS/RMS may document the network path by storing information that may include the information received from each reporting network path device as well as the relative order in which each of the respective network path device broadcast messages are received.

BRIEF DESCRIPTION OF THE DRAWINGS

Exemplary embodiments according to the present invention are described below with reference to the above drawings, in which like reference numerals designate like components.

DETAILED DESCRIPTION OF PREFERRED EMBODIMENTS

Figure 1:
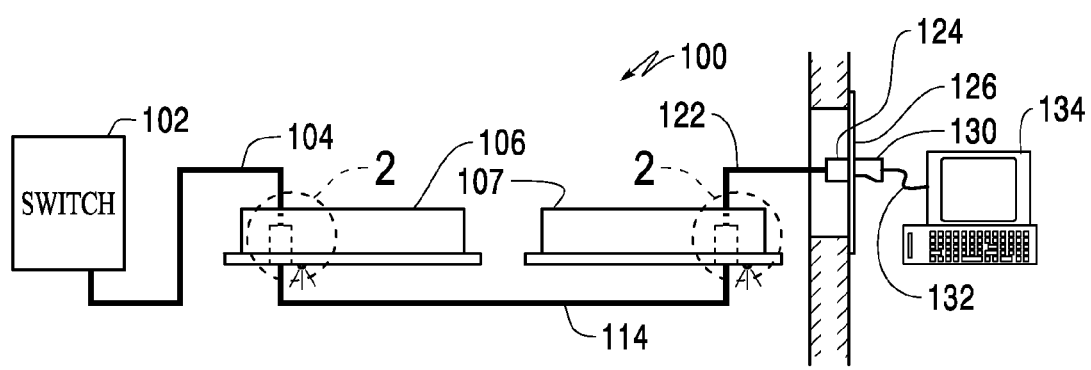
FIG. 1 is a schematic diagram of a representative network path within a communication network.

FIG. 1 is a schematic diagram of a representative network path 100 within a communication network. As shown in FIG. 1, a switch 102 is connected to other network components via a network connection (not shown) and via a patch cord 104 to a first patch panel 106. The first patch panel 106 is connected to a second patch panel 107 by a patch cord 114. The second patch panel 107 is connected to a wall plate 126 that includes a communication active jack 124 via horizontal cabling 122. An end-user device 134 may connect to network path 100 via cable 132 with cable terminator 130.

Figure 2:
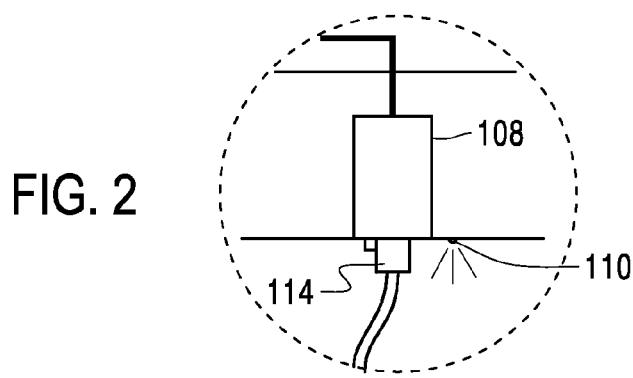
FIG. 2 is a detail view of features shown in FIG. 1.

FIG. 2 is a detail view of patch panel features shown in FIG. 1. As shown in FIG. 2, each patch panel may include at least one patch panel active jack 108. Each patch panel active jack 108 may be associated with one or more light emitting diodes (LEDs) or other light emitters that may be activated and/or deactivated in support of network cable move/add/change operations, as described in greater detail below.

A patch panel active jack 108 may connect to a backend cable via a hard-wired (e.g., a punch-down block) or other connection accessible via a back face of the patch panel. Patch panel active jack 108 may provide a standard patch cord interface (e.g., that supports RJ-45 terminated cables) via a front face of a patch panel. Further, one or more LEDs 110 associated with patch panel active jack 108 may be controlled via the patch panel by the NMS/RMS or other system to direct move/add/change operations. Each patch panel active jack 108 may be configured as an individual modular unit. One or more modular patch panel active jacks 108 may be installed within a patch panel chassis. For example, in one exemplary embodiment, patch panel active jacks 108 installed within a patch panel may connect to and interface with a main patch panel circuit board, or motherboard.

Figure 3:
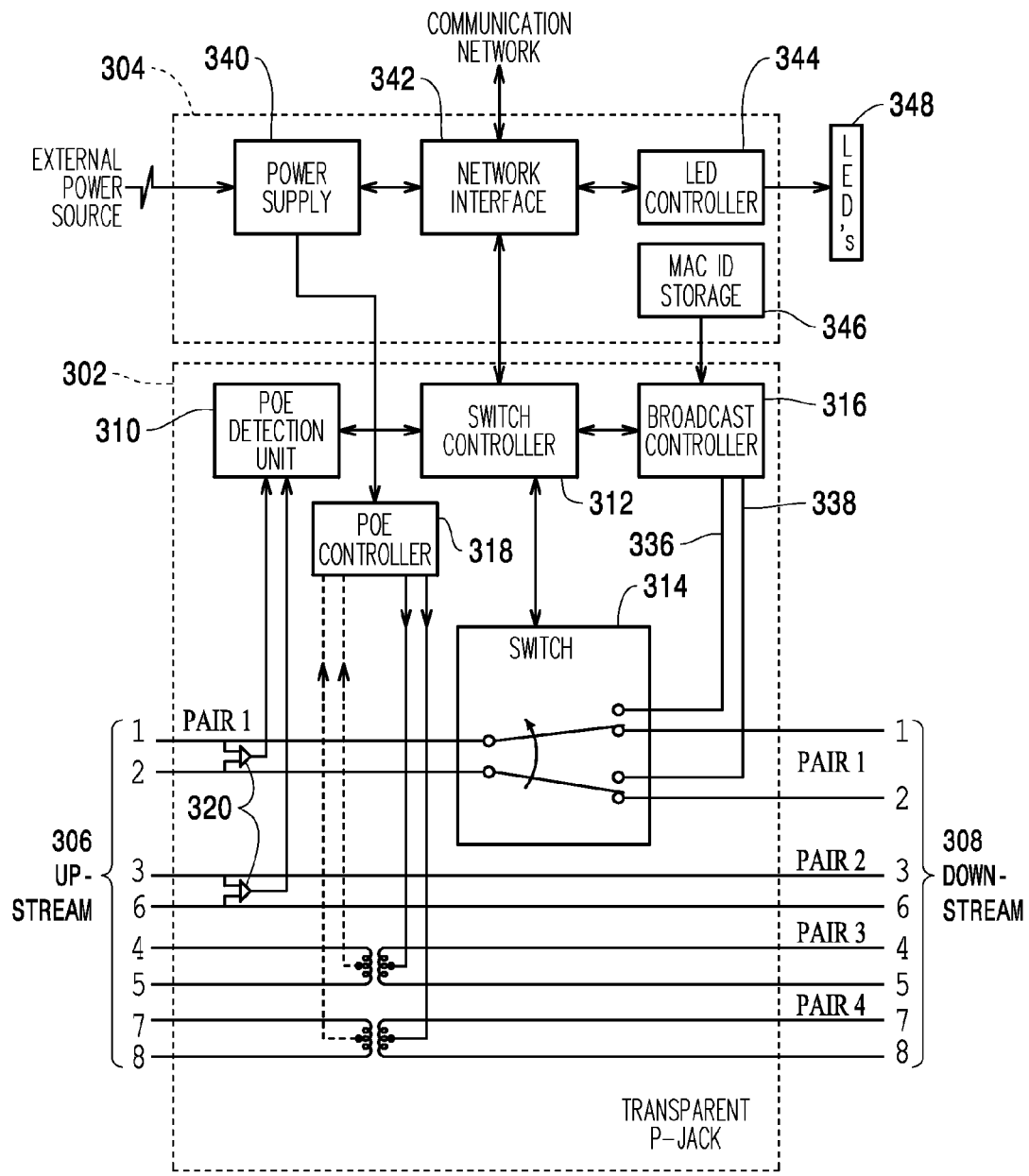
FIG. 3 is a block diagram of a first exemplary embodiment of a communication active jack.

FIG. 3 is an exemplary block level diagram of a patch panel active jack 302 that is connected to and in communication with a patch panel motherboard 304, as described above. As shown in FIG. 3, a patch panel active jack 302 may include an upstream network path cable connection 306, a downstream network path cable connection 308, a PoE detection unit 310, a switch controller 312, a switch 314, and a broadcast controller 316.

Patch panel active jack 302 may further include a PoE controller 318 that manages power received via PoE or from a host device (e.g., patch panel power supply 340) to operate circuitry within patch panel active jack 302. Further, patch panel active jack 302 may be configured to supply PoE power to the network path. For example, as shown in FIG. 3, PoE controller 318 may receive power to operate patch panel active jack 302 from patch panel power supply 340 or optionally (as indicated in FIG. 3 with dashed lines) via PoE from leads 4 and 5 (pair-3) and leads 7 and 8 (pair-4) of upstream network path cable connection 306. Further, PoE controller 318 may supply PoE power to leads 4 and 5 (pair-3) and leads 7 and 8 (pair-4) of downstream network path cable connection 308 to provide power to downstream PoE dependent network devices (e.g. communication active jack 124 in wall plate 126 as shown in FIG. 1). In addition, patch panel active jack 302 may contain a differential amplifier, such as an op-amp 320, connected between PoE detection unit 310 and each pair of leads connected to PoE detection unit 310.

In reference to FIG. 1, upstream network path cable connection 306 corresponds with the hard-wired (e.g., a punch-down block) or other connection accessible via a back face of patch panel 106. Downstream network path cable connection 308 corresponds with the standard patch cord interface (e.g., that supports RJ-45 terminated cables) accessible via a front face of patch panel 106.

In FIG. 3, leads 1 and 2 (pair-1) of upstream network path cable connection 306 may be pass-through lines that deliver PoE power from an upstream PoE source device to each downstream device in the network path. As described above, the NMS/RMS may determine what devices and ports support a network path by merely interrupting and restoring PoE on the network path. In response, each downstream device may respond, as described below, to report device information for each device downstream of the network path device instructed by the NMS/RMS to interrupt and then restore PoE power on leads 1 and 2.

Referring again now to FIG. 3, PoE detection unit 310 may monitor leads 1 and 2 (pair-1) and/or leads 3 and 6 (pair-2) on upstream network path cable connection 306 for the presence of PoE power provided by an upstream device to patch panel active jack 302. As shown, the signals on pair-1 and/or pair-2 on upstream network path cable connection 306 may be each differentially amplified before being passed to PoE detection unit 310 using op-amp 320. Upon failing to detect the presence of PoE power on pair-1 and/or pair-2 of upstream network path cable connection 306, PoE detection unit 310 may notify switch controller 312. In response to the notification, switch controller 312 may activate switch 314 to redirect leads 1 and 2 (pair-1) of upstream network path cable connection 306 to broadcast controller 316 via leads 336 and 338, thereby disconnecting downstream connectivity on pair-1 to the adjacent downstream device in the network path.

Note that although not shown in FIG. 3, PoE detection unit 310 may be configured to monitor any, or all, leads on upstream connection 306 via connections similar to the leads shown in FIG. 3 used to monitor pair-1 and pair-2. That is, in addition to, or instead of, monitoring pair-1 and/or pair-2, pair-3 and/or pair-4 may be monitored. Thus, for example, pair-2 may be monitored while pair-1 of upstream network path cable connection 306 is switched between downstream network path cable connection 308 and broadcast controller 316. Further, in addition to monitoring for the presence of PoE power, PoE detection unit 310 may be configured to monitor for other indications that the upstream connection 306 is active. For example, PoE detection unit 310 may be configured to monitor any, or all, wire pairs for the presence of an Ethernet signal, or any other protocol that would indicate that the line is in active use rather than, or in addition to, monitoring for the presence of PoE power. The switch controller 312 and/or the broadcast controller 316 may be triggered if the PoE power decreases to below a predetermined level for a preset amount of time, for example. Thus, if a momentary power outage occurs rather than a planned event for system documentation, the system may just power back up without going through documentation. Alternatively, the preset amount of time may be short enough such that any power outage causes the system to document the network upon powering up the system.

If the upstream network path cable connection 306 is redirected by switch 314, switch controller 312 may notify broadcast controller 316 of the redirection. In response to the notification, broadcast controller 316 may begin broadcasting a unique message that includes a unique identifier (e.g., a MAC ID) associated with patch panel active jack 302. The message may be broadcast via lines 336 and 338 onto upstream network path cable connection 306 leads 1 and 2, respectively, to the network connected NMS/RMS via the next upstream device in the network path. Broadcast controller 316 may continue to broadcast the unique patch panel active jack message until an acknowledgment message is received from the NMS/RMS. The message may be received via upstream network path cable connection 306 or via a network message received from the NMS/RMS via patch panel motherboard 304. The unique patch panel active jack message may be broadcast continuously at a predetermined repetition rate until a response is received by patch panel active jack 302. Similarly, the response may be broadcast continuously until a receipt is received by the NMS/RMS or until downstream connectivity is restored.

Upon receipt of an acknowledgment message from the NMS/RMS, broadcast controller 316 may stop broadcasting, and switch controller 312 may activate a switch 314 to reconnect leads 1 and 2 (pair-1) of upstream network path cable connection 306 to leads 1 and 2 (pair-1) of downstream network path cable connection 308, thereby restoring downstream connectivity on pair-1 to the adjacent downstream device in the network path. Once connectivity is restored, the unique identifying message broadcast by the broadcast controller of the downstream patch panel active jack may be transmitted over the restored path to the NMS/RMS.

In this manner, interrupting and restoring PoE on leads 1 and 2 of a network path results in each device downstream of the interruption successively reporting their respective device information to the NMS/RMS where the information may be stored within a dynamically maintained network topology information base maintained by the NMS/RMS.

As described above with respect to FIG. 1, each device along a network path may include a modular active jack that monitors PoE service and may respond, as described above, to maintain a centralized base of network topology information. This centralized base may be a single electronic device or a series of distributed devices. Such a modular active jack may be installed in a network connected device, such as a patch panel (as described above with respect to FIG. 1 at 106 and 107), a wall plate (as described above with respect to FIG. 1 at 126), or any other device along the network path (e.g., a hub, repeater, etc.).

Depending upon the nature of the device within which an active jack may be installed, the active jack may connect with and interface with electronics within that device. For example, when installed within an exemplary intelligent patch panel, as described above with respect to FIG. 3, the active jack may connect to leads on a circuit board, or motherboard, within the host device. As shown in FIG. 3, a host device such as patch panel motherboard 304 may provide an active jack with access to an external power supply via power supply 340, access to network connectivity that is independent of the network path supported by the active jack via network interface 342. Further, the host device may include an LED controller 344 that may operate LED(s) 348. LED(s) 348 may be used to support network cable move/add/change operations involving connection and disconnection of network cables to/from the active jack. As shown in FIG. 3, patch panel active jack 302 may receive power from patch panel power supply 340, and may communicate over a network connection supported by patch panel network interface 342.

Further, although not shown in FIG. 3, a second switch may be inserted on pair-2 with leads to broadcast controller 316. The switch on pair-2 may be controlled by switch controller 312 in a similar manner as switch 314 on pair-1. In such an exemplary embodiment, in response to control signals from switch controller 312 to the respective switches, one or both pair-1 and pair-2 may be re-routed to broadcast controller 316. Broadcast controller 316 may transmit the same or different information depending on which pair(s) is being controlled. Broadcast controller 316 may be configured to listen for signals transmitted by the NMS on pair-1 and pair-2 of upstream network path connection 306. Further, broadcast controller 316 may be configured to store the information received from the NMS for use in configuring/controlling patch panel active jack 302, and/or may forward the received information to a controller (not shown) on patch panel motherboard 304.

As shown in FIG. 3, patch panel motherboard 304 may support additional features, such as MAC ID storage 346. MAC ID storage 346 may provide patch panel active jack 302 with a unique MAC ID for broadcast over the upstream network path cable connection 306, in response to a loss of PoE service, as described above.

Figure 4:
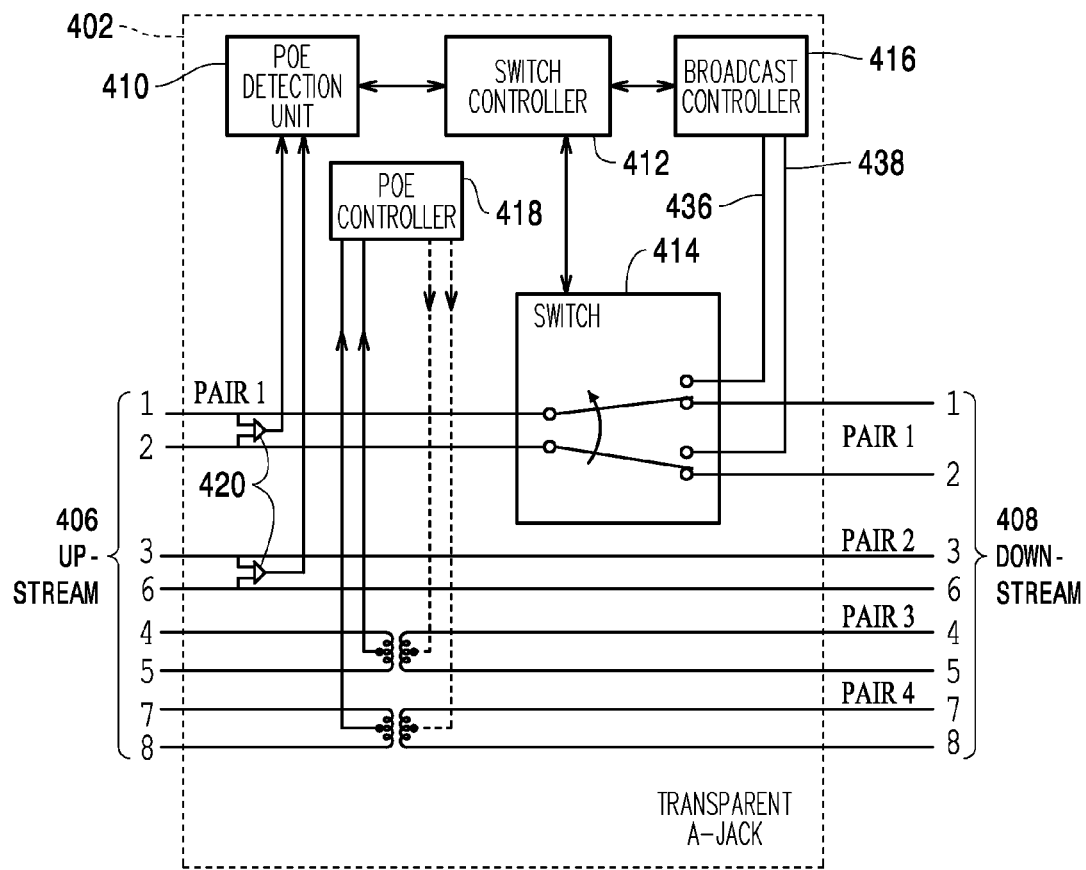
FIG. 4 is a block diagram of a second exemplary embodiment of a communication active jack.

FIG. 4 is a block level diagram of an exemplary active jack 402 that is not supported by additional circuitry and functionality supplied by a host device, as described above with respect to FIG. 3. For example, communication active jack 124 within wall plate 126 (see FIG. 1) is an example of such a communication active jack configuration. Other examples, may be active jacks attached to passive devices such as passive (as opposed to intelligent) patch panel cabinets that do not include any electronics, or active jacks included within network devices that include circuitry, but that do not support functional connectivity to the active jack as described above with respect to FIG. 3. Despite a lack of support functions provided by a host device (e.g., an intelligent patch panel), active jack 402 supports the collection of network path connectivity information in the same manner as patch panel active jack 302, as described above with respect to FIG. 3.

As shown in FIG. 4, an active jack 402 may include an upstream network path cable connection 406, a downstream network path cable connection 408, a PoE detection unit 410, a switch controller 412, a switch 414, and a broadcast controller 416. Active jack 402 may further include a PoE controller 418 that manages PoE power received via upstream network path cable connection 406 to operate circuitry within active jack 402. Further, active jack 402 may be optionally configured to supply PoE power to the downstream network path. For example, as shown in FIG. 4, PoE controller 418 may receive power to operate active jack 402 via PoE from leads 4 and 5 (pair-3) and leads 7 and 8 (pair-4) of upstream network path cable connection 406. Further, PoE controller 418 may optionally supply (as indicated in FIG. 4 with dashed lines) PoE power to leads 4 and 5 (pair-3) and leads 7 and 8 (pair-4) of downstream network path cable connection 408 to provide downstream PoE dependent network devices with power.

In reference to FIG. 1, the upstream network path cable connection 406 may correspond with the connection between horizontal cable 122 and active jack 124 in wall plate 126. The downstream network path cable connection 408 may correspond with the standard end-user device port interface that receives a terminator 130 of cable 132 that connects an end-user device 134 to the far downstream end of network path 100. However, depending upon the type of device within which the active jack is embedded, active jack 402 may be present anywhere along the network path. For example, an active jack may be embedded within any intelligent device capable of supporting the active jack with functionality (e.g., FIG. 3), or within any intelligent device that may house and that may supply power to the active jack, but that may provide little else with respect to functional support to the active jack. Further, an active jack may be embedded within a variety of passive network devices, such as passive patch panels that provide no power and no functionality.

In the exemplary embodiment depicted in FIG. 4, which is similar to that of FIG. 3, leads 1 and 2 (pair-1) of upstream network path cable connection 406 may be pass-through lines that deliver PoE power from an upstream PoE source device to each downstream device on the network path. As described above, the NMS/RMS may determine the devices and ports that support a network path by interrupting and restoring PoE on the network path. In response, each downstream device may respond as described below to sequentially report device information for each device downstream of the device instructed by the NMS/RMS to interrupt and then restore PoE power on leads 1 and 2.

Referring again now to FIG. 4, PoE detection unit 410 may monitor leads 1 and 2 (pair-1) and/or leads 3 and 6 (pair-2) on upstream network path cable connection 406 for the presence of PoE power provided from an upstream device to active jack 402. Upon failing to detect the presence of PoE power on pair-1 and/or pair-2 of upstream network path cable connection 406, PoE detection unit 410 may notify switch controller 412. In response to the notification, switch controller 412 may activate switch 414 to redirect leads 1 and 2 (pair-1) of upstream network path cable connection 406 to broadcast controller 416 via leads 436 and 438, thereby disconnecting downstream connectivity on pair-1 to the adjacent downstream device in the network path.

Next, switch controller 412 may notify broadcast controller 416 of the redirection. In response to the notification, broadcast controller 416 may begin broadcasting a unique message that may include a unique identifier (e.g., a MAC ID) associated with active jack 402. The message may be broadcast via lines 436 and 438 onto upstream network path cable connection 406 leads 1 and 2, respectively, to a network connected NMS/RMS via the next upstream device in the network path. Broadcast controller 416 may continue to broadcast the unique patch panel active jack message until an acknowledgment message is received from the NMS/RMS via upstream network path cable connection 406. The unique identifier can be provided from a memory of the broadcast controller 416, similar to the broadcast controller 316 above.

Upon receipt of an acknowledgment message from the NMS/RMS, broadcast controller 416 may stop broadcasting, and switch controller 412 may activate switch 414 to reconnect leads 1 and 2 (pair-1) of upstream network path cable connection 406 to leads 1 and 2 (pair-1) of downstream network path cable connection 408, thereby restoring downstream connectivity on pair-1 to the adjacent downstream device in the network path. Once connectivity is restored, the unique identifying message broadcast by the broadcast controller of the adjacent downstream active jack may be transmitted over the restored path to the NMS/RMS.

In this manner, interrupting and restoring PoE on leads 1 and 2 of a network path may result in each device downstream of the interruption sequentially reporting its respective device information to the NMS/RMS where the information may be stored as an update to a store of dynamically maintained network path connectivity information maintained by the NMS/RMS, as described above. The information can be reported sequentially from the most upstream device (i.e. the device most proximate electrically to the NMS/RMS or most distal from the end-user device) to the most downstream device (i.e. the device most distal electrically to the NMS/RMS or most proximate from the end-user device). Alternatively, the information can be reported from the most downstream device to the most upstream device or in any other sequence desired, for example, if the information is reported by the network interface or by leads other than those disconnected from the NMS/RMS.

In an IT infrastructure in which exemplary active jacks (e.g., as described above with respect to FIG. 3 and FIG. 4) are deployed in support of a network path connectivity, an NMS/RMS may determine network path connectivity by interrupting and restoring PoE on the network path. For example, referring now to FIG. 1, if the NMS/RMS were to instruct switch 102 to interrupt and then restore PoE service to the port supporting network cable 104, each of the respective downstream active jack devices on the network path (e.g., patch panel 106, patch panel 107, and wall-plate mounted communication active jack 124) may respond with unique identifier and/or additional topology information as connectivity to each of the respective devices is sequentially restored. Further, with respect to FIG. 3, if the NMS/RMS system were to communicate via patch panel network interface 342 with an active jack switch controller 312, the NMS/RMS may instruct active jack switch controller 312 to toggle switch 314 in order to temporarily interrupt PoE service downstream of the patch panel. In such a scenario, each of the respective downstream active jack devices on the network path (i.e., patch panel 107 and wall-plate mounted communication active jack 124) may respond with unique identifier and/or additional topology information as connectivity to each of the devices is sequentially restored. In this manner, the NMS/RMS may obtain network path documentation updates for any portion of the network to which PoE service is temporarily interrupted.

Further, the NMS/RMS may automatically receive network path topology information associated each time a physical network cable connection is disconnected and then reconnected. In such a scenario, the NMS/RMS may use the unique identifiers and/or other information included within each of the respective active jack broadcast messages to update existing network path connectivity information.

The active jack network path reporting capabilities, described above, may be used to support routine network cable move/add/change operations. For example, to facilitate removal of a patch cord between two patch panels that include active jacks, the NMS/RMS may instruct the two patch panels to illuminate LEDs associated with the patch panel active jacks on each of the respective patch panels that are connected by a common patch cord. Further, the NMS/RMS may instruct the active jack associated with the downstream patch panel to broadcast the active jack's unique message on the upstream network path connection until PoE service is lost. The NMS/RMS may use the pair of leads of the active jack or the network interface of the motherboard to instruct the active jack to broadcast the active jack's unique message. In addition, the NMS/RMS may instruct the downstream patch panel to turn off the LED associated with the downstream active jack upon the downstream patch panel receiving feedback from the downstream patch panel active jack that PoE service has been lost. In such a scenario, the operator may direct the NMS/RMS to turn off the LED on the upstream patch panel once both ends of the patch cord are removed. Alternatively, the NMS may automatically turn off the LED on the upstream patch panel after expiration of an appropriate time frame (e.g., 15 seconds or less to 2 minutes or more).

By way of a second example, to facilitate addition of a patch cord between two patch panels that include active jacks, the NMS/RMS may instruct the two patch panels to illuminate LEDs associated with the patch panel active jacks on the respective patch panels to be connected by a common patch cord. When PoE is detected by the downstream patch panel active jack, the active jack may respond by transmitting the active jack's unique message on the upstream network path. If the NMS/RMS determines that the unique message is received via the correct upstream port, the NMS/RMS may turn off both LEDs and the switches on the respective patch panel active jacks may be actuated to establish downstream connectivity.

The above discussion relates to only a few of the many ways of documenting network path connectivity within a communication network. The present invention is not limited to analysis of the exemplary IT infrastructure network paths described above, but may be applied to any IT network architecture/configuration in which active jacks are deployed, as described above, to support network path connectivity.

Active jacks may be implemented in any number of modules and are not limited to any specific hardware or software module architecture. Each active jack module may be implemented in any number of ways and is not limited in implementation to execute process flows precisely as described above. The network path documentation process, described above, may be modified in any manner that supports documentation of network path connectivity.

It is to be understood that various functions of the NMS/RMS functionality used in support of the network path documentation process may be distributed in any manner among any quantity (e.g., one or more) of hardware and/or software modules or units, computer or processing systems or circuitry.

An active jack that supports the network path documentation process may support any type of network cabling that supports PoE power distribution along a network path. An active jack may support any type of cable and cable connector, including but not limited to RJ-45 based connectors.

An active jack switch (e.g., FIG. 3, at 324) that supports the network path documentation process may support the redirection of any type of network cabling, including but not limited to copper cabling. Although an exemplary relay module may be configured to redirect cable conductors associated with an RJ-45 connector, such an embodiment is exemplary only and should not be interpreted as limiting a relay module to redirecting RJ-45 based conductors exclusively.

NMS/RMS processes associated with the network path documentation processes may be integrated within a stand-alone system or may execute separately and be coupled to any number of devices, workstation computers, server computers or data storage devices via any communication medium (e.g., network, modem, direct connection, etc.). The NMS/RMS processes associated with the network path documentation process can be implemented by any quantity of devices and/or any quantity of personal or other type of computers or processing systems (e.g., IBM-compatible, Apple, Macintosh, laptop, palm pilot, microprocessor, etc.). The computer system may include any commercially available operating system (e.g., Windows, OS/2, Unix, Linux, DOS, etc.), any commercially available and/or custom software (e.g., communication software, load-averaged smoothing process software, etc.) and any types of input devices (e.g., keyboard, mouse, probes, I/O port, etc.).

Communication active jack and NMS/RMS software associated with the network path documentation process may be implemented in any desired computer language, and could be developed by one of ordinary skill in the computer and/or programming arts based on the functional description contained herein and the described workflows. For example, in one exemplary embodiment, support for the network path documentation process within an NMS/RMS and/or within the communication active jack may be written using the C++ programming language, however, the present invention is not limited to being implemented in any specific programming language. The various modules and data sets may be stored in any quantity or types of file, data or database structures. Moreover, the software associated with the network path documentation process may be distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

The format and structure of internal structures used to hold network path connectivity information in support of the network path documentation process may include any and all structures and fields and are not limited to files, arrays, matrices, status and control booleans/variables.

The network path documentation process software within the NMS/RMS may be installed and executed on a computer system in any conventional or other manner (e.g., an install program, copying files, entering an execute command, etc.). The functions associated with the network path documentation process may be performed on any quantity of computers or other processing systems. Further, the specific functions may be assigned to one or more of the computer systems in any desired fashion.

The network path documentation process may accommodate any quantity and any type of data set files and/or databases or other structures containing stored network path connectivity information in any desired format (e.g., ASCII, plain text, any word processor or other application format, etc.).

Network path documentation process output may be presented to a user in any manner using numeric and/or visual presentation formats. Network path analysis output may be presented as input to a graphical user interface or an analysis tool in either numeric or visual form and can be processed by the analysis tool in any manner and/or using any number of threshold values and/or rule sets.

Further, any references herein of software performing various functions generally refer to computer systems or processors performing those functions under software control. The computer system may alternatively be implemented by hardware or other processing circuitry. The various functions of the network path documentation process may be distributed in any manner among any quantity (e.g., one or more) of hardware and/or software modules or units, computer or processing systems or circuitry, where the computer or processing systems may be disposed locally or remotely of each other and communicate via any suitable communication medium (e.g., LAN, WAN, Intranet, Internet, hardwire, modem connection, wireless, etc.). The software and/or processes described above may be modified in any manner that accomplishes the functions described herein.

From the foregoing description it will be appreciated that novel network path documentation methods and apparatus are disclosed that are capable of accurately documenting a deployed network infrastructure based upon assessment of network path connectivity within the network.

While specific embodiments of apparatus and methods of documenting network path connectivity are disclosed, these embodiments should be viewed as illustrative, not limiting. Various modifications, improvements and substitutes are possible within the scope of the present invention. Although specific terms are employed herein, they are used in their ordinary and accustomed manner only, unless expressly defined differently herein, and not for purposes of limitation.

The invention claimed is:

1. A method of documenting a network system comprising at least one of a network management system (NMS) or a revision management system (RMS) and comprising a connector that contains an upstream network path cable connection having a plurality of pairs of leads and a downstream network path cable connection having pairs of leads corresponding to the plurality of pairs of leads of the upstream network path cable connection, the method comprising:
   (a) monitoring a signal provided to the connector;
   (b) disconnecting a pair of leads of the upstream network path cable connection from the corresponding pair of leads of the downstream network path cable connection after a predetermined change in the signal has been detected by the connector;
   (c) connecting a transmitter in the connector to the pair of leads of the upstream network path cable connection after the predetermined change in the signal has been detected by the connector;
   (d) transmitting a broadcast signal from the upstream network path cable connection;
   (e) the at least one of the NMS or the RMS receiving the broadcast signal and providing a response thereto;
   (f) terminating transmission of the broadcast signal after the response to the broadcast signal has been received by the connector;
   (g) disconnecting the transmitter from the pair of leads of the upstream network path cable connection after the response has been received by the connector; and
   (h) reconnecting the pair of leads of the upstream network path cable connection with the pair of leads of the downstream network path cable connection after the response has been received by the connector.

2. The method of claim 1, wherein the connector monitors Power-over-Ethernet (PoE) power supplied to the upstream network path cable connection.

3. The method of claim 1, wherein the connector monitors an Ethernet signal supplied to the pair of leads of the upstream network path cable connection.

4. The method of claim 1, further comprising supplying PoE power to the connector, the connector managing the PoE power to operate the circuitry within the connector.

5. The method of claim 1, wherein the connector receives the response via a network connection other than the upstream network path cable connection.

6. The method of claim 1, wherein the connector receives the response via the upstream network path cable connection.

7. The method of claim 1, wherein the system comprises a plurality of the connectors connected such that the downstream network path cable connection of an upstream connector is connected to the upstream network path cable connection of a downstream connector, the method being repeated from the connector furthest upstream sequentially to the connector furthest downstream.

8. The method of claim 1, wherein more than one pair of leads of the upstream network path cable connection is connectable to and disconnectable from: the corresponding pairs of leads of the downstream network path cable connection and the transmitter.

* * * * *